United States Patent
Baranov et al.

(10) Patent No.: US 7,333,030 B2
(45) Date of Patent: Feb. 19, 2008

(54) METHOD AND SYSTEM FOR PREVENTING AN AIRCRAFT FROM PENETRATING INTO A DANGEROUS TRAILING VORTEX AREA OF A VORTEX GENERATOR

(75) Inventors: Nikolai Alekseevich Baranov, Moscow (RU); Andrei Sergeevich Belotserkovski, Moscow (RU); Mikhail Igorevich Kanevski, Moscow (RU); Igor Vladimirovich Pasekunov, Moscow (RU)

(73) Assignees: Joint Stock Company "Spetstekhnika", Zhukovskogo (RU); FAPRID, Moscow (RU)

( * ) Notice: Subject to any disclaimer, the term of this patent is extended or adjusted under 35 U.S.C. 154(b) by 187 days.

(21) Appl. No.: 10/565,531

(22) PCT Filed: Jul. 25, 2003

(86) PCT No.: PCT/RU03/00332

§ 371 (c)(1),
(2), (4) Date: Jan. 23, 2006

(87) PCT Pub. No.: WO2005/010554

PCT Pub. Date: Feb. 3, 2005

(65) Prior Publication Data

US 2006/0244637 A1 Nov. 2, 2006

(51) Int. Cl.
*G08B 23/00* (2006.01)
*G08B 21/00* (2006.01)
(52) U.S. Cl. .......................... 340/963; 340/945; 701/9; 701/10
(58) Field of Classification Search ................ 340/963, 340/945, 964, 965, 966, 967, 968, 969, 970; 701/3, 9, 10, 14
See application file for complete search history.

(56) References Cited

U.S. PATENT DOCUMENTS 4,137,764 A 2/1979 Hallock et al. ........... 73/178 D (Continued)

FOREIGN PATENT DOCUMENTS

DE 10039109 2/2002

(Continued)

*Primary Examiner*—Toan N. Pham
(74) *Attorney, Agent, or Firm*—Morgan & Finnegan, LLP (57) ABSTRACT

The invention relates to methods and devices for aircraft's safe operation and is embodied in the form of a method and system for informing a user, for example an aircraft crew and/or a flight controller, on the probable penetration of the aircraft into dangerous areas of the vortex shedding of vortex generators which are located near the aircraft at a forecast time when the aircraft passes through a simulated control plane situated at a preventive distance in the direction of motion of the aircraft, said distance being calculated on a basis of a sufficient forecast period so that the aircraft carries out a flight evasive manoeuvre. The preventive system defines the trajectory and intensity of the vortex shedding of the vortex generators, the co-ordinates of intersecting points of the vortex sheddings with a control plane, the geometric parameters of the dangerous areas thereof (26, 27) according to danger criteria specified by a user, forms a warning area (28) in said control plane, an area of the forecast positions of the aircraft (25) and dangerous vortex shedding areas (26, 27) at a forecast time, follows up the events of crossing the warning area (28) and/or the area of the aircraft forecast positions (25) associated with the dangerous vortex shedding areas (26, 27) and draws attention of the user to said event with the aid of display devices (16, 17) and a visualisation device (18).

18 Claims, 3 Drawing Sheets

U.S. PATENT DOCUMENTS

| | | | |
|---|---|---|---|
| 5,009,598 A | 4/1991 | Bennington | 434/30 |
| 5,657,009 A | 8/1997 | Gordon | 340/968 |
| 5,724,040 A | 3/1998 | Watnick | 342/26 D |
| 6,177,888 B1* | 1/2001 | Cabot et al. | 340/968 |
| 6,424,408 B1* | 7/2002 | Ooga | 356/28.5 |
| 6,703,945 B2* | 3/2004 | Kuntman et al. | 340/961 |

FOREIGN PATENT DOCUMENTS

| | | |
|---|---|---|
| RU | 2087037 | 8/1997 |
| RU | 2088487 | 8/1997 |

* cited by examiner

METHOD AND SYSTEM FOR PREVENTING AN AIRCRAFT FROM PENETRATING INTO A DANGEROUS TRAILING VORTEX AREA OF A VORTEX GENERATOR

This U.S. national phase application is based on and claims priority to international application PCT/RU2003/000332 that designated the United States of America and of which the entire description and drawings thereof are incorporated herewith by reference.

TECHNICAL FIELD

The proposed invention deals with methods and devices providing safe operation of aircraft, in particular with warning and/or prevention of situations related with risk of aircraft encounter with danger areas of disturbed air flow caused by another object, including wake vortices induced by the object airflow.

BACKGROUND OF THE INVENTION

The problem of aircraft flight safety is of current importance and includes a number of scientific, technical and organizational problems. One of the problems is to provide flight safety under conditions where the decisive factor is subjection of aircraft to high turbulence aerodynamic jets caused by generators moving near the aircraft, as well as by other objects, which undergo the airflows of high level of turbulence and vorticity.

It is well known that aircraft moving in the airspace generate the so called 'wake vortices'.

The aircraft encounter with wake vortices of a generator, e.g. of another aircraft results in the substantial change of the attack and sideslip angles. The encountering aircraft is exposed to aerodynamic forces and moments that may throw it aside from the wake. This may cause accidents when flying at low altitudes, for example, during take-off and landing, as such disturbances cannot be counterbalanced by the aircraft controls in all cases.

Aircraft with low aspect wings and high wing load generate wake vortices of higher strength increasing the vortex danger.

A large body of research on wake transport and attenuation shows that the atmospheric factors such as wind, wind shift, stratification and turbulence play an important role in these processes.

There exists a potential to optimize the safe separations during landing, take-off and cruising flight by means of accurate prediction of wake vortex dynamics with due regard to current weather conditions, short-range weather forecast, and in-ground effects.

One of the main ways for solution of the safe flight problem, when the main factor is the aerodynamic wake, is the selection of flight modes ensuring the required safety level.

The development of airborne computer systems working in real time, estimating the danger level of aerodynamic disturbances that influence the aircraft and permitting the selection of methods for correction of the aircraft flight control for the purpose of best compensating the disturbances is beneficial for the problem decision.

Another problem, which may be called an informational one, is the problem of informing the pilot on the wake vortex location and the relative position of the aircraft in the prediction period of time.

The method and device for visualization of wake vortices by means of mathematical simulation on the basis of the known parameters of aircraft generating wake vortices with due account of atmospheric conditions are well known. According to the technical decision, the device uses a fast-response display where the simulated wake vortices generated by each aircraft located in the vicinity of the given aircraft are visualized (U.S. Pat. No. 5,845,874, A). However, if the given aircraft is surrounded by a great number of other aircraft, for example, in the vicinity of an airport, the display will show a great number of simulated wake vortices and it will be difficult to identify which wake vortices are of real danger for the aircraft and which ones could be ignored.

One of the most perspective ways of increasing flight safety is informing the pilot in real time on the forecasted location of dangerous wake vortices.

The airborne wake vortex alert system informing the aircraft crew on the risk of encounter with wake vortex area of another aircraft only when the system has determined that the encounter will occur after the predetermined time is well known (U.S. Pat. No. 6,177,888, A). The system provides the interaction between the both aircraft, the exchange of warning signals and of information on the current altitude, distance and bearing, wake path tracking with account of the local wind speed, and determines the distance or time needed for the aircraft to encounter the wake vortex area of another aircraft. The system displays the warning of the wake vortex area proximity when the needed distance or time is less than the given threshold. The wake vortex area size is calculated in each of the points distributed along the wake vortex path as a function of the distance between the point and the aircraft generating the wake.

However this system does not solve the problem of informing the pilot on the hazard level if the aircraft encounters wake vortices and does not suggest any correct maneuver to avoid the encounter.

In addition, the variety of aircraft operation conditions requires reduction of distances between the aircrafts, for example such the reduction during the consecutive take-offs or landings could increase the airport capacity.

The reliable knowledge of location and structure of wake vortices and their effect on aircraft flight would help to meet the conflicting requirements on the increase of flight efficiency and safety.

The airborne wake vortex alert system warning the pilot against the predicted hazard due to the presence of other aircraft in the aircraft vicinity (U.S. Pat. No. 6,211,808, B1) is well known. The system comprises a spherical antenna made of dielectric material that has eight sectors with a receiver in each to receive microwave signals reflecting from other aircraft located in the vicinity. However, the system is rather expensive and does not inform the pilot on the presence of hazardous air disturbances.

The technical decision related to the scheme and method to prevent collision of the aircraft path and wake vortices of another aircraft is well known (WO 00/71985). This method consists in determining the position, geometry and type of another aircraft wake vortices, which presence has been revealed by means of information received from the first aircraft airborne systems, from the second aircraft or from the aerodrome, determining the altitude of the second aircraft, the forecasted position of its wake vortices with due regard for the weather conditions, in particular, the wind velocity and direction, and ambient temperature, adjusting the received data with the reference table, or modeling the wake vortices with visualization of its location and path with respect to the first aircraft, and, finally, forecasting the intersection point of the wake and first aircraft paths with generation of the alarm signal if the intersection may occur. Basically, the method is used to provide safety of two aircraft flying in the airport terminal area and its implementation could result in increase of the first aircraft altitude over the second aircraft using the Traffic Alert and Collision Avoidance Systems. However, the first aircraft pilot receives visual information on all the vorticity areas that are suspected to be in the flight area of the first aircraft due to the presence of the second aircraft. Hence the first pilot could not have the real picture of dangerous vortices.

It is well known that the National Aeronautics and Space Administration (NASA), USA, gives much attention to the airport terminal area efficiency, in particular during take-off and landing. One of the directions for R & D works is development of the Aircraft Vortex Spacing System (AVOSS), which will combine the outputs of different systems and produce weather dependent dynamic criteria for wake vortex spacing (37th Aerospace Sciences Meeting & Exhibit, Jan. 11-14, 1999, Reno, Nev., NASA Langley Research Center, Hampton, Va.). The system represents the current and forecasting weather conditions, the models of wake vortex transport and decay under these weather conditions from the ground surface up to the altitude of the take-off and landing glideslopes, as well as performs the feedback for wake vortex behavior in real time.

The correlation of the wake vortex behavior with the predetermined sizes of the safety corridor and with the data on wake decay results in the required aircraft spacing. If the wakes exist longer than it was expected, the reduction of intervals between aircraft take-offs or landings is prohibited. The wake behavior is calculated for a number of landing 'windows' from the glideslope altitude to the runway threshold. However, this system has a number of restrictions such as the lack of due regard for the vertical wind, which may prevent the wake descent or produce its ascent; the lack of due regard for the ambient turbulence scale necessary for correct simulation of the wake decay; and some others. These restrictions may lead to contingency due to the discrepancy between predetermined wake vortex parameters at the dispatcher's disposal and the actual wake parameters. Besides, the use of the AVOSS will increase dispatcher workload raising the probability of wrong decisions.

It is well to bear in mind that the foreign safety systems are mainly designed for the use under the so called 'Instrument Flight Rules' (IFR) when the control of aircraft is carried out on the basis of the commands made by a flight controller, which are implemented either in directory or automatic mode on the aircraft board.

However, it is well known that the most critical juncture of things in operator activities is the correct decision in an emergency situation. It consists of two stages: identification of the situation and determination of the operating procedure to eliminate the emergency situation. Prior to performing each of the further actions the control officer should envisage his further steps. The perception of visual and voice signals in verbal form from long-term memory or from a display, or orally, needs a certain time under conditions of time deficiency. The time needed for perception of graphic symbols is far less. Identification of the situation with object indication permits improving the decision adequacy.

Moreover, the effect of such a physical factor as acceleration causes detraction of the pilot brain circulation, which may force even loss of the pilot consciousness under emotional and nervous tension. Therefore the information necessary for decision-making is preferable to place at the pilot or flight controller disposal before the occurrence of actual time for decision and in graphical symbols.

SUMMARY OF THE INVENTION

The goal of the present invention is development of the warning system preventing possible encounter of aircraft with danger areas of wake vortices generated by an object, which is named as the 'vortex generator' and situated in the aircraft vicinity. The generators could be not only aircraft but also surface facilities with wake vortices that could be dangerous for aircraft. A set of points where the aircraft could run the risk of great aerodynamic forces and moments is named as the 'danger area of wake vortices.'

The invention was designed to the aim of developing the method and system for preventing an aircraft from penetration into a dangerous trailing vortex area of a vortex generator with areas dangerous from the aircraft construction and operation points of view. The method and devices should provide to the pilot the information on the presence near the aircraft of hazardous wake vortices, on their movement and possible ways of the aircraft exit from the danger areas through prediction of the aircraft position and the generator wake vortex danger areas in the predetermined control section ahead of the aircraft at the distance permitting the maneuver of evasion from the danger areas when it is necessary. It is appropriate to determine the wake location with due regard to evolution of ambient parameters and to predict the aircraft position with due regard for the possible changes in its configuration and the established flight regulations.

By the changes in the aircraft configuration is meant, for example the change of the engine operation mode including the engine failure, the change in the aircraft geometry (wing sweep, ice accretion, etc.) and other changes leading to the change of the flow regime and as a result to the change of the aircraft aerodynamic forces and moments caused by the effect of aerodynamic disturbances including wake vortices, as well as to the change of the aircraft ability to compensate the disturbances.

The task for developing the device realizing the method according to the invention method was proposed also.

The task in hand has been fulfilled by the development of the method and system for preventing an aircraft from penetration into a dangerous trailing vortex area of a vortex generator comprising:

acquisition of current information on the aircraft configuration, location and attitude with respect to the inertial frame;

acquisition of current information on the position, geometry and weight characteristics, as well on the motion parameters of the wake vortex generator with respect to the inertial frame;

storage of the information on the generator position and motion parameters with respect to the inertial frame;

acquisition of current information on the ambient parameters in the area of the aircraft and generator collocation;

determination of the current generator wake path in the form of the set of the generator vorticity area centers with respect to the inertial frame and on the current intensity of the generator wake vortices;

storage of the information on the generator wake path in the form of the set of the generator vorticity area centers with respect to the inertial frame and on the current intensity of the generator wake vortices;

selection of the delay time within which the aircraft has a possibility of a flight evasive maneuver providing evasion of the aircraft from the generator wake danger area after the signal warning against the possibility of wake encounter has been received;

calculation of the delay distance, which equals to the distance covered by the aircraft during the delay time, modeling the control plane situated in front of the aircraft perpendicular to its flight direction at the delay distance, and determination of the forecasted time necessary for the aircraft to gain the control plane in the inertial frame;

determination of the geometrical characteristics of the generator wake vortex danger areas in the form of the set of the danger areas of the generator vorticity regions at the forecasted time;

determination of the generator wake path in the form of the set of the generator vorticity region centers with respect to the inertial frame and of the intensity of the wake vortices at the forecasted time;

determination of the coordinates of the intersection point of the generator wake vortex trajectory and the control plane at the forecasted time of the aircraft flight through it;

forming around the above intersection point of the wake vortex danger area in the form of the set of the generator vorticity danger areas, where the entering aircraft may have the flight parameters exceeding the admissible limits; forming in the control plane of the area of the aircraft forecasted positions at the forecasted time of the aircraft intersection with the control plane with due regard for the flight regulations; forming around the region of the aircraft forecasted positions of the warning area; the information on the entrance of the wake danger areas into the warning area will be provided to the user;

determination of the coordinates of the points of the region of the aircraft forecasted positions, of the warning area and of the wake vortex danger areas with respect to the aircraft frame;

calculation of the distance from the warning area to the danger area of wake vortices;

calculation of the distance from the area of the aircraft forecasted positions to the danger area of wake vortices;

indication for the user of the nulling of the distance from the warning area to the danger area of the generator wake vortices;

emergency indication for the user of the nulling of the distance from the warning area to the danger area of the generator wake vortices The method according to the invention has the following features:

preferable use of the information on the generator type, velocity, angular rate, and coordinates of the generator path points as the information on the generator position, geometry, weight, and motion parameters;

storage of the information on the generator path point coordinates, velocity, and angular rate of vortex generator in the inertial frame;

preferable use of the information on the local wind velocity and direction, altitude wind profile, turbulence intensity, and type of the underlying terrain as the information on the ambient parameters;

calculation of the trajectory and intensity of the generator wake vortices in the form of the set of the generator vorticity area centers at the current time moment on the basis of the saved information on the type of the vortex generator, its path point coordinates, flight velocity and angular rate or on the basis of instrumental measurements;

simulation of the control plane on the basis of information on the protected aircraft location, attitude, flight velocity and the chosen delay time at the current time moment in the inertial frame;

evaluation of the danger area geometry of the generator wake vortices in the form of the set of the generator vorticity danger areas on the basis of the saved information on the path point coordinates of the generator wake vortices as the set of the trajectories of the generator vorticity area centers in the inertial frame and the wake intensity, as well as on the basis of information on the protected aircraft location, flight velocity, and angular rates in the inertial frame;

evaluation of the trajectory and intensity of the generator wake vortices at the delay time on the basis of information on the trajectory and intensity of the generator wake vortices as the set of the trajectories of the generator vorticity area centers in the inertial frame;

evaluation of the coordinates of the intersection points of the generator wake vortex trajectory with the control plane at the delay time on the basis of information on the control plane coordinates in the inertial frame and on the generator wake vortex trajectory in the inertial frame at the delay time;

construction in the control plane of the generator wake vortex danger area, the aircraft forecasted position and warning areas on the basis of information on the coordinates of the intersecting points of the generator wake vortex trajectory with the control plane at the delay time, information on the danger area geometry of the generator wake vortices in the form of the set of the generator vorticity danger areas, information on the location, attitude, flight velocity and angular rates of the protected aircraft with due regard for the flight regulations currently in force;

evaluation of the coordinates of the area of the aircraft forecasted positions, coordinates of the alert area and coordinates of the wake vortex danger area in the aircraft frame on the basis of information on the coordinates of the alert area, of the area of the aircraft forecasted positions with due regard for the flight regulations currently in law and of the wake vortex danger area at the delay time, as well as on the basis of information on the aircraft coordinates and its attitude, preferably, on the aircraft angles of pitch, yaw, and roll in the inertial frame at the current time.

When implementing the method for preventing an aircraft from penetration into a dangerous trailing vortex area of a vortex generator, the user according to the invention receives only necessary information on the wake vortices, sufficient to undertake efficient maneuver preventing the aircraft from penetration into the wake vortices. It is possible to reduce the volume of the induced information keeping only the useful part of it, by means of pre-processing of the information on the wake vortices, which is realized in the present invention. As a result, the user, for example the pilot, perceives adequately the aircraft position with respect to the wake vortices at the delay time. This permits timely taking precautions to prevent the aircraft encountering the wake vortex danger areas. Furthermore, the advantage of this method of warning is the possibility of account for the changes in the aircraft aerodynamic forces and moments due to the change of the aircraft configuration, as this feature provides the adaptation of the method operations to the external situation, flight parameters, and the aircraft system operation modes.

According to the invention, it is appropriate to perform the preventing method operations simultaneously for each of the wake vortex generators located in the aircraft vicinity.

Moreover, according to the invention, it is appropriate in the preventing method to perform the current correction of the chosen delay time allowing a consideration of particular features of the flight modes and tasks.

Moreover, according to the invention, it is appropriate in the preventing method to perform the current correction of the coordinates of the area of the aircraft forecasted positions coping with situations of uncertainty of incoming information by means of the corresponding change in the size of the area of the aircraft forecasted positions.

Moreover, according to the invention, it is appropriate in the preventing method to perform the current correction of the warning area allowing a correction of the decision-making time for performing an appropriate maneuver preventing the wake vortex encounter.

It is appropriate, according to the invention, to perform the above correction in a manual, semiautomatic, or automatic mode.

Moreover, according to the invention, it is appropriate to supply the user with information on the coordinates of the control plane, alert area, area of the aircraft forecasted positions, and wake vortex danger areas of the generators located in the aircraft vicinity.

It is appropriate, according to the invention, to visualize for the user the information on the location of the area of the aircraft forecasted positions in the control plane and information on the location of the generator wake vortex danger areas.

Moreover, it is desirable, according to the invention, to indicate the nulling of the distance from the warning area to the danger area of the generator wake vortices in the control plane and/or the nulling of the distance from the area of the aircraft forecasted positions to the danger area of the generator wake vortices by means of an appropriate indication method including visual, audio, and tactile indication.

Moreover, it is appropriate, according to the invention, to save information on the chosen delay time, coordinates of the control plane, coordinates of the area of the aircraft forecasted positions, and coordinates of the wake vortex danger areas of the generators for a time of emergency indication of the nulling of the distance from the area of the aircraft forecasted positions to the danger area of the generator wake vortices.

The problem was solved also by development of the system for preventing an aircraft from penetration into a dangerous trailing vortex area of a vortex generator which comprises:

the aircraft parameters tracker capable of receiving information on the aircraft configuration, location and attitude with respect to the inertial frame at the current time;

the vortex generator tracker capable of receiving information on the position, geometry and weight characteristics, as well on the motion parameters of the wake vortex generator with respect to the inertial frame at the current time;

the memory device capable of saving information on the vortex generator position and motion parameters in the inertial frame;

the ambient parameters detector capable of receiving information on the ambient parameters in the area of the aircraft and generator collocation at the current time;

the wake vortex tracker capable of determining the generator wake path in the form of the set of the generator vorticity area centers in the inertial frame and the wake vortex intensity;

the memory device capable of saving information on the generator wake path in the form of the set of the generator vorticity area centers in the inertial frame and on the wake vortex intensity;

the device for selection of the delay time capable of calculating the time period within which the aircraft has at least a possibility of a flight evasive maneuver providing evasion of the aircraft from the generator wake danger area after the signal warning against the possibility of the wake vortex encounter has been received;

the device for simulation of the control plane capable of calculating the delay distance, which equals to the distance covered by the aircraft during the delay time, modeling the control plane situated in front of the aircraft perpendicular to its flight direction at the delay distance, and determining the forecasted time necessary for the aircraft to gain the control plane in the inertial frame;

the device for determination of the danger area parameters capable of determining the geometrical characteristics of the generator wake vortex danger areas in the form of the set of the danger areas of the generator vorticity regions at the forecasted time;

the forecasting device capable of determining the generator wake path in the form of the set of the generator vorticity region centers with respect to the inertial frame and of the intensity of the generator wake vortices at the forecasted time;

the device for calculation of the intersection points capable of determining the coordinates of the intersection points of the generator wake vortex trajectory and the control plane at the forecasted time of the aircraft flight through it;

the areas and regions forming device capable of forming around the intersection point of the wake vortex path and the control plane of the wake vortex danger area in the form of the set of the generator vorticity danger areas, where the entering aircraft can have the flight parameters exceeding the admissible limits; forming in the control plane of the area of the aircraft forecasted positions at the forecasted time of the aircraft intersection with the control plane with due regard to the flight regulations; forming around the region of the aircraft forecasted positions of the alert area; the information on the entrance of the wake danger areas into the alert area will be provided to the user;

the transformation unit capable of calculating the coordinates of the area of the aircraft forecasted positions, of the alert area and of the wake vortex danger area in the aircraft frame;

the first intersection conditional test unit capable of calculating the distance from the alert area to the wake vortex danger area and marking its nulling;

the second intersection conditional test unit capable of calculating the distance from the area of the aircraft forecasted positions to the wake vortex danger area and marking its nulling;

the indication unit capable of indicating the nulling of the distance from the alert area to the generator wake vortex danger area;

the emergency indication unit capable of indicating the nulling of the distance from the area of the aircraft forecasted positions to the danger area of the generator wake vortices.

According to the invention the system has the following features:

the aircraft parameters tracker is capable of receiving information at least on the aircraft configuration, coordinates, flight velocity, pitch, yaw, and roll angles;

the vortex generator tracker is capable of receiving information at least on the vortex generator type, flight velocity, angular rates, and coordinates of the generator trajectory points;

the ambient parameters detector is capable of receiving information at least on the magnitude and direction of the local wind velocity, the wind altitude profile, ambient turbulence intensity, and the underlying terrain type;

the wake vortex tracker is capable of determining the generator wake path in the form of the set of the generator vorticity area centers and the wake vortex intensity on the basis of the saved information on the vortex generator type, velocity, angular rates, and coordinates of the generator trajectory points;

the device for simulation of the control plane is capable of modeling the control plane on the basis of the information on the aircraft position, attitude, flight velocity, and the delay time;

the device for determination of the danger area parameters is capable of determining the geometrical characteristics of the generator wake vortex danger areas on the basis of the saved information on the trajectory point coordinates and intensity of the generator wake vortices, as well as of the information on the aircraft configuration, position, flight velocity and angular rates in the inertial frame;

the forecasting device is capable of determining the generator wake trajectory and intensity on the basis of the information on the wake trajectory in the form of the set of the trajectories of the generator vorticity region centers in the inertial frame and of the wake intensity;

the device for calculation of the intersection points is capable of determining the coordinates of the intersection points of the generator wake vortex trajectory and the control plane on the basis of the information on the coordinates of the control plane and the wake vortex trajectory in the inertial frame at the forecasted time;

the areas and regions forming device is capable of forming the wake vortex danger area, area of the aircraft forecasted positions and the alert area on the basis of the information on the coordinates of the intersection point of the generator wake vortex path and the control plane at the forecasted time, of the information on the geometrical characteristics of the danger area in the form of the set of the generator vorticity danger areas, of the information on the aircraft position, attitude, flight velocity and angular rates with due regard for the flight regulations in the inertial frame;

the transformation unit is capable of calculating the coordinates of the area of the aircraft forecasted positions, of the warning area, and of the wake vortex danger area in the aircraft frame on the basis of information on the coordinates of the area of the aircraft forecasted positions, of the alert area, and of the wake vortex danger area, as well as of information on the aircraft coordinates and attitude, preferably on the pitch, yaw, and roll angles in the inertial frame at the current time.

It is appropriate, according to the invention, to include in the system the vortex generator tracker, memory devices, the wake vortex tracker, device for determination of the danger area parameters, forecasting device, device for calculation of the intersection points, areas and regions forming device, first and second intersection conditional test units, indication and emergency indication units capable of simultaneously performing their functions with respect to each of the vortex generators located in the aircraft vicinity.

Moreover, according to the invention, it is desirable to have a possibility of current correction of the delay time in the device for selection of the delay time.

Moreover, according to the invention, it is desirable to develop the areas and regions forming device with a possibility of performing the current correction of the coordinates of the area of the aircraft forecasted positions.

Moreover, according to the invention, it is desirable to develop the areas and regions forming device with a possibility of performing the current correction of the coordinates of the alert area.

It is appropriate also, according to the invention, to adjust the delay time, the coordinates of the area of the aircraft forecasted positions and the coordinates of the alert area in the manual or semi-automatic mode.

Moreover, according to the invention, it is possible to perform the above correction in the automatic mode.

Such the accomplishment of the warning system devices provides flexibility of its implementation in the both manual and automatic (hereafter referred as the "automatic control system"—ACS) modes.

Moreover, according to the invention, it is appropriate that the warning system should contain the device for the user to visualize the information on the location of the area of the aircraft forecasted positions and generator wake vortex danger areas in the control plane.

According to the invention, the indication and emergency indication devices may be chosen from the group containing devices of visual, audio and tactile indication.

Besides, according to the invention, the warning system comprises the device for evaluation of the parameters of the generator wake vortex danger areas comprising:

the unit for the aircraft schematization capable of calculating the set of the aircraft geometrical characteristics necessary for evaluation of additional aerodynamic forces and moments induced by the generator wake vortices and acting on the aircraft on the basis of information on the aircraft configuration, coordinates, flight velocity, angles of pitch, yaw, and roll;

the unit for evaluation of aerodynamic forces and moments acting on the aircraft at the given point and induced by the generator wake vortices, capable of calculating them on the basis of the saved information on the paths of the wake vortex points in the form of the sets of the trajectories of the vorticity area centers and the intensity of the generator wake vortices in the inertial frame, of the information on the aircraft configuration, position, flight velocity, angular rates in the inertial frame, and on the aircraft geometry;

the unit for estimation of the hazard level of the aerodynamic perturbations at the given point capable of estimating the hazard level on the basis of the criterion chosen by the user;

the unit for determination of the points where the aircraft aerodynamic forces and moments induced by the generator wake vortices are dangerous capable of determining the coordinates of the points of the danger areas on the basis of their selection under the hazard criterion chosen by the user;

the unit for evaluation of the geometrical characteristics of the wake vortex danger areas capable of calculating them on the basis of information on the coordinates of points of the danger areas.

Such the accomplishment of the preventing system using the device for evaluation of the parameters of the wake vortex danger areas, according to the invention, enables due regard for the aircraft configuration and the pilot skill when choosing the hazard criterion.

According to the invention, the admissible value of the aircraft angle of roll may be chosen as a hazard criterion.

Besides, according to the invention, the roll moment of an aircraft induced by the wake vortices can be chosen as a hazard criterion.

It is appropriate, according to the invention, to use the unit for evaluation of the geometrical characteristics of the wake vortex danger area could be capable of approximating the danger area boundary allowing simplification of the wake vortex danger area visualization in the visualization unit.

Therefore, according to the invention, the wake vortex tracker and predictor include a programmable component and the unit for evaluation of the danger area parameters is realized in the programmable component software.

Moreover, according to the invention, the device for evaluation of the danger area parameters may include a database containing characteristics of wake vortex danger areas for generators of different types under various flight conditions.

Moreover, according to the invention, the preventing system may contain the memory unit for storage of information on the delay time, control plane coordinates, area of the aircraft forecasted positions and generator wake vortex danger areas within the period of emergency indication of the nulling of the distance from the area of the aircraft forecasted positions to the danger area of the generator wake vortices.

BRIEF DESCRIPTION OF THE DRAWINGS

In what follows, the invention is illustrated by description of an example of embodiment of the preventing method by means of the preventing system according to the invention without limitation of the invention within its scope and by the drawings enclosed where.

DESCRIPTION OF THE PREFERRED OF THE EMBODIMENTS

Figure 1:
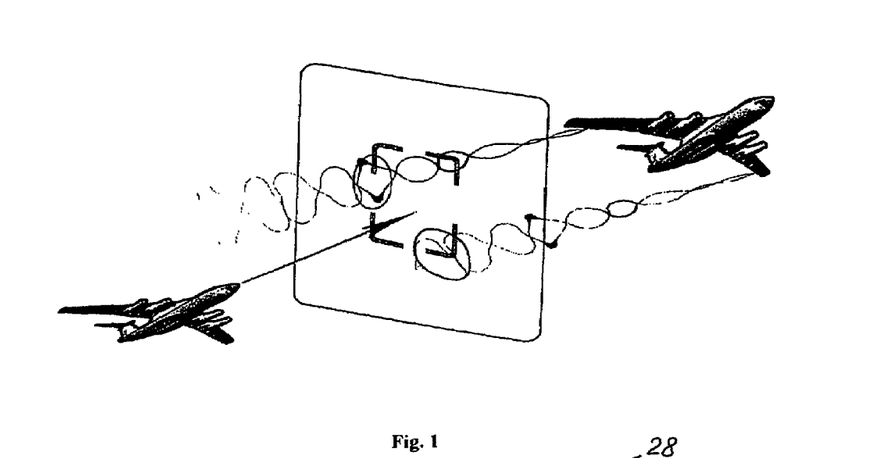
FIG. 1 contains the schematic sketch of the aircraft, the vortex generator, its wake vortices, and information represented in the control plane according to the preventing method in accordance to the described embodiment of the invention.

The invention may be illustrated by its embodiment that is presented in FIG. 1, where the warning system is implemented consisting of the standard equipment on board of the aircraft (hereafter the A/C), another aircraft is the vortex generator (hereafter the VG) and the A/C crew is the information user. The specific terms will be used for description but it should be realized that each of the terms covers all equivalent terms that are used to solve similar tasks.

When implementing the method for warning about possible encounter of the A/C with danger areas of the VG wake vortices, according to the invention, a volume of information on the A/C position at the prediction time at the calculated delay distance in front of the A/C and on forecasted location around it of the VG wake vortices that would be dangerous for the A/C is formed in the control plane. The information, according to the invention, should be corrected with due regard for the ambient conditions at the place of location of the control plane.

Figure 2:
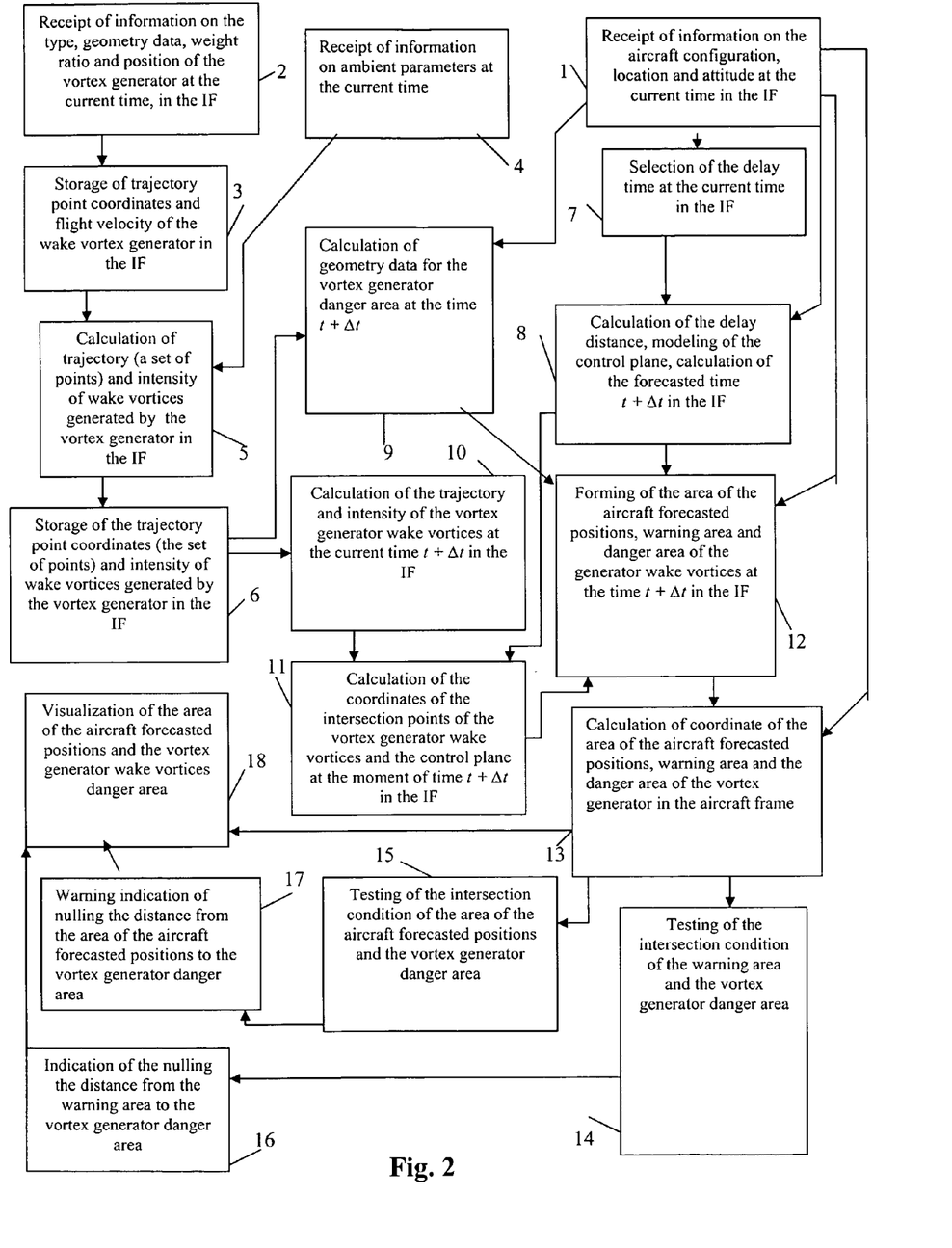
FIG. 2 contains the schematic of embodiment of the method for warning about possible encounter of aircraft with danger areas of generator wake vortices according to the invention by means of the warning system according to the invention.

According to FIG. 2, the presented system for warning about possible encounter of the A/C with danger areas of the VG wake vortices, according to the invention, includes the tracker 1 for the A/C parameters realized, for example, in the computer of the A/C automatic control system (hereafter the A/C ACS). The tracker receives, for example from the A/C instrumentation, information on the A/C configuration, coordinates, flight velocity, angular rates, and angles of pitch, yaw, and roll at the current t in the internal frame (hereafter the IF).

The tracker 2 for the VG realized, for example in the computer of the A/C ACS, receives, for example from the forward looking radar or from a ground controller, or through a multiplex channel for data exchange, and the memory unit 3 stores information on the VG type, flight velocity, angular rates, and coordinates of its trajectory points in the IF.

Detector 4 of ambient parameters realized, for example in the instrumentation computer, receives, for example from the air data system ADS or from the flight controller, information on the local wind speed and direction, vertical wind profile, turbulence level, and type of underlying terrain in the region of joint location of the A/C and GV in the IF at the current time t.

The tracker 5 for wake vortices, realized, for example in the A/C ACS computer, on the basis of information received from the memory unit 3 calculates the VG wake vortex trajectory and intensity in the form of the set of trajectories of the vorticity centers in the IF, for example by means of algorithms such as the well known algorithm for calculation of wake vortex trajectory and intensity (Northwest Research Association, Inc., Aircraft Vortex Spacing System (AVOSS), Algorithm Version 3.1.1), which provides calculation of the vorticity center coordinates on the basis of integration of differential equations describing the vorticity region evolution in space and time. The memory unit 6 stores this data.

Parameters of vorticity region coordinates also can be determined by means of instrumental measurements, for example by means of laser-radars (lidars), as well as by means of measurement and estimation of wind flow tangential velocities with further calculation of the wake vortex trajectory and intensity.

The unit 7 for selection of the delay time, for example realized in the A/C ACS computer, calculates the delay time necessary to perform maneuvers for changing the A/C trajectories. The selected delay time, according to the invention, can be corrected in the current mode by means of manual, semiautomatic, or automatic control with due regard for different factors such as the pilot skill or specific features of the flight task.

The unit 8 for modeling of the control plane (hereafter the CP), on the basis of information from unit 1 on the A/C coordinates, flight velocity, angles of pitch, yaw, and roll and of information from unit 7 on the selected delay time, calculates the delay distance that is equal to the distance covered by the A/C within the selected delay time, simulates the CP located in front of the A/C perpendicular to the A/C flight direction at the delay distance from the A/C, for example in the form of the CP equation coefficients in the IF, and evaluates the forecasted time t+Δt of the A/C trajectory intersection with the CP in the IF. Any computing device capable of performing such the calculations, for example the A/C onboard computer, can be used as unit 8.

The forecasting unit 9, on the basis of information on the VG wake vortex trajectory and intensity saved in device 6 and on the forecasted time from device 7, calculates the VG wake vortex as a set of the vorticity center trajectories at the forecasted time t+Δt in the IF and intensity.

The unit 10 for evaluation of the danger area parameters on the basis of information from unit 1 on the A/C coordinates, flight velocity and angular rates and of information from the memory unit 6 on the VG wake vortex trajectory point coordinates in the form of the set of the VG vorticity region center trajectories and intensity, evaluates, according to the chosen hazard criterion, geometrical characteristics of the VG wake vortex danger areas in the form of the VG vorticity region danger areas at the forecasted time t+Δt. One can choose according to the invention, for example, the admissible roll of the A/C or the admissible roll moment generated by the VG wake vortices as the hazard criterion.

The tracker 5 for wake vortices and the forecasting unit 9, according to the invention, can contain the programmable component (in the presented case this is the VG wake vortex trajectory and intensity) and the unit 10 can be realized inside this component software, i.e. in the database on calculated geometrical characteristics of wake vortex danger areas for VG of different types depending on different ambient conditions and the VG motion parameters, as well as on different aerodynamic forces and moments induced on the A/C by wake vortices of different intensity, for example roll moments.

The unit 11 (FIG. 2) realized, for example in the onboard instrumentation computer, calculates the coordinates of the intersection points of the VG wake vortex path with the CP at the forecasted time t+Δt on the basis of information on the CP coordinates from unit 8 and of information form unit 9 on the wake vortex path, for example by means of selection of wake vortex path points located on the both sides of the CP and interpolation of the distance between them.

The unit 12 for forming zones and regions installed, for example in the computer of the A/C inertial navigation system, forms around the intersection point of the GV wake vortex path with the CP, the wake vortex danger area; the area of the A/C forecasted positions (hereafter the AAFP) with due regard for the flight operation rules and standards at the forecasted time t+Δt; and the alert area (hereafter the AA) as a set of points in the CP. According to the invention, unit 12 is capable of current correcting the coordinates of the AAFP and AA. The latter is important for the pilot when coordinating an evasive maneuver with the flight task execution.

The transformation unit 13 calculates the coordinates of the AAFP, the VG wake vortex danger area, and AA in the aircraft frame.

Then the first unit 14 for checking of the intersection condition calculates the distance from the AA to the wake vortex danger area, tracking the distance nulling event, and the second unit 15 for checking of the intersection condition calculates the distance from the AAFP to the VG wake vortex danger area, tracking the distance nulling event.

The information on the above distances nulling at the forecasted time arrives to indicators 16 and 17 installed at the user site, for example in the A/C cabin. As an example, let the information arrives to the device 16 for audio indication in case of the distance between the AA and the wake vortex danger area nulling and then, for example, the information arrives at the device 17 for tactile indication in case of the distance between the AAFP and the wake vortex danger area nulling. The tactile indication is intended to prompt the pilot to take urgent efforts to perform an evasive maneuver. It is important that the pilot has at his disposal sufficient time chosen by the user taking account of the A/C flight speed. In accordance with the situation, after the receipt of the first indication signal the pilot may correct the delay time, for example by means of the manual control setting the digital parameter of the delay time or using automatic control setting the condition of increment or decrement of this time.

When the above distances increase, the indication terminates demonstrating that the A/C has overcome the hazard situation and favoring removal of the pilot stress.

It is appropriate, according to the invention, to visualize the information on mutual location of the AAFP and the danger area in the CP at the forecasted time in the visualization unit 18, for example on the display or on the A/C navigation chart, as well as to visualize the danger area position only after they intersect the AA in order to reduce information of little importance for the pilot.

Figure 3:
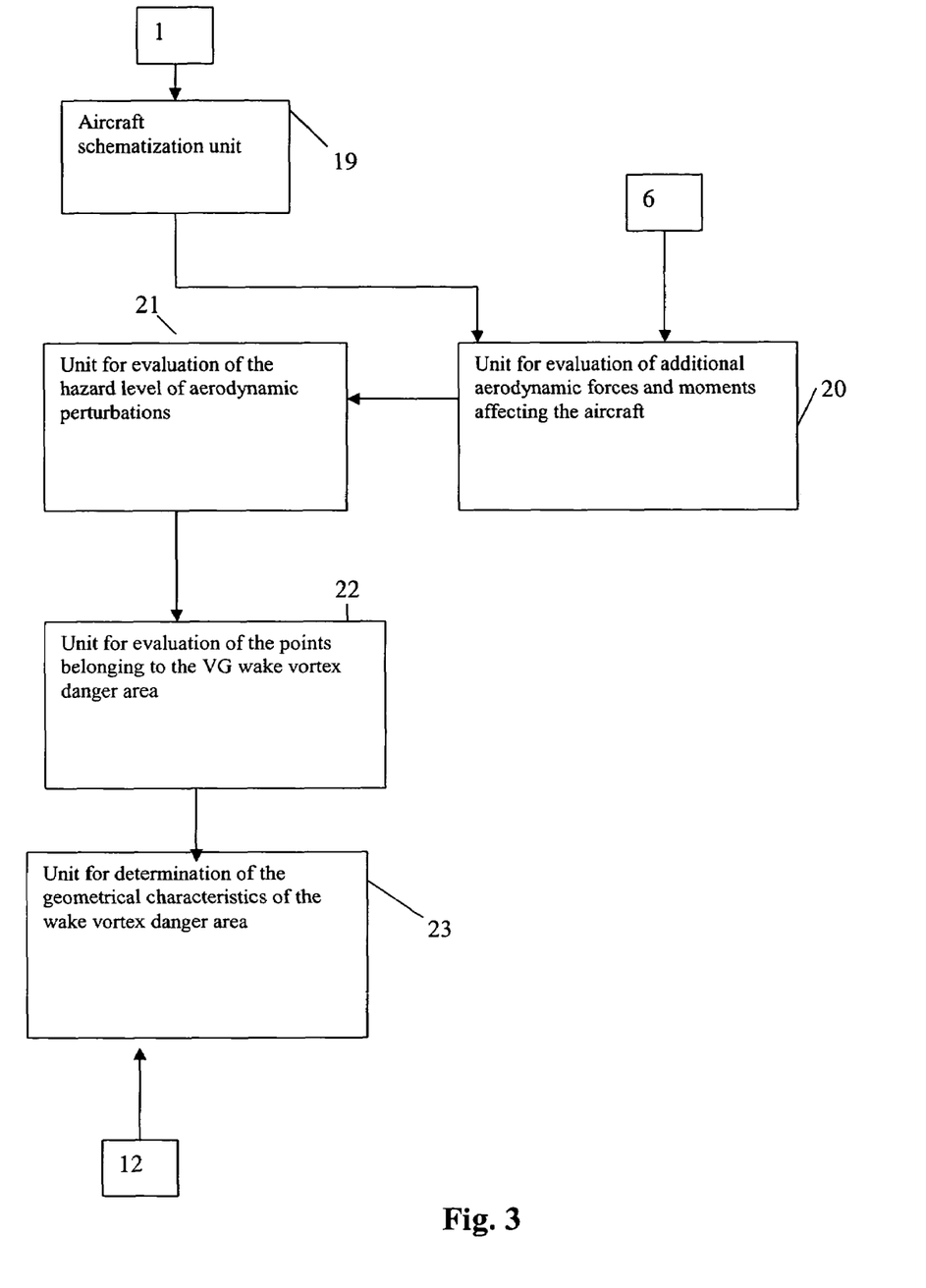
FIG. 3 contains the schematic of embodiment of the unit for evaluation of the parameters of the generator wake vortex danger areas according to the invention.

According to the invention, the device for evaluation of the danger area parameters, 10, may be designed according to the invention, and contain, as it is depicted in FIG. 3, the A/C schematization unit 19 receiving information from the warning system device 1 (FIG. 2) designed in a certain way and calculating the set of the A/C geometrical data with due regard for the A/C configuration; unit 20 receiving information from the unit 19 and from the warning system device 6 (FIG. 2) and calculating the additional aerodynamic forces and moments induced by the VG wake vortices. Then the unit 21 evaluates the hazard level of the aerodynamic perturbations at the given point on the basis of the given hazard criterion, unit 22 determines the points belonging to the wake vortex danger areas, and unit 23 determines geometrical data of the danger area in the form of the set of points and approximates the danger area boundaries to simplify visualization of the danger area on the display. Then the information on the VG wake vortex danger area parameters arrives to the warning system device 8 and is visualized in case of wake vortex encounter risk.

Figure 4:
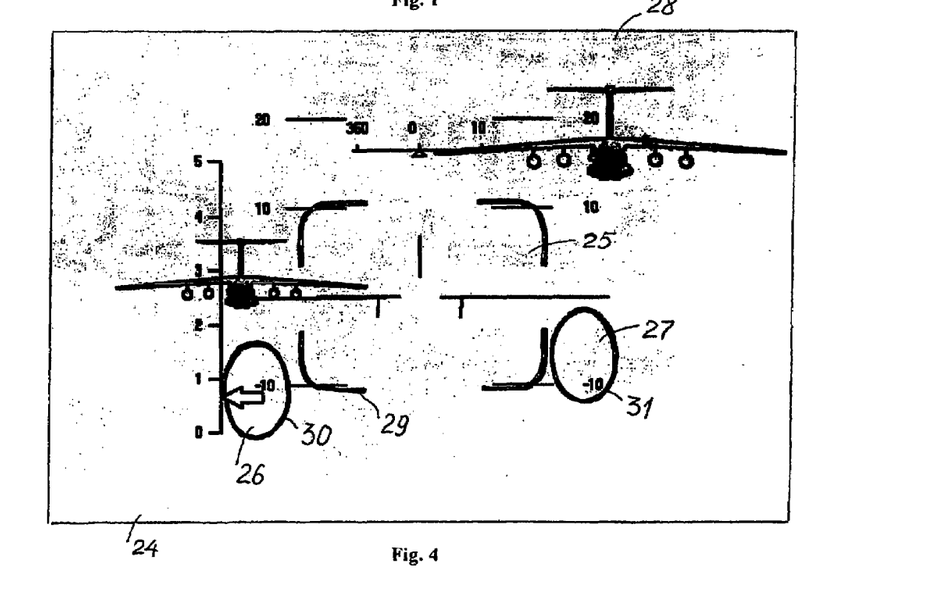
FIG. 4 contains the schematic of presentation on the navigation chart display of information provided by the warning system according to the invention.

FIG. 4 includes the navigation chart display 24 which is usually used on the A/C board for indication of the A/C heading and depiction of symbols generated by the onboard inertial navigational system, for example by the Airborne Inertial Navigation System (AINS), with representation of the AAFP 25 and the VG wake vortex danger areas 26 and 27 at the forecasted time. The AAFP 25 can have, for example, the squared shape with the sizes proportional to the sizes of the A/C body possible positions. The boundary of the AA is not shown on the display as, according to the invention, it is appropriate to represent the wake vortex danger areas on the display only in the case that the danger areas intersect with the AA with simultaneous, for example, sound indication of this event. Therefore, one may consider that the alert area 28 is presented on the display. The wake vortex danger areas 26 and 27 can have the form, for example, of a circle or of other geometrical figure convenient for visual perception. The picture may be accompanied by visual indication, for example by light or color indication, of regions 25, 26, and 27 or their boundaries 29, 30, and 31, and in the case of the event of intersection of the boundary 29 for the AAFP 25 with the boundary of a region, for example of the danger area 26, can be accompanied by emergency audio or tactile indication.

Of course, though the given example contains only one generator of wake vortices and only one danger area of the single VG, the calculations and tracking of the VG wake vortices could be performed for all VG located in the A/C vicinity, but only those VG wake vortex danger areas should be displayed that could be hazardous for the A/C. The pilot can make an adequate decision on the maneuver removing the A/C from the wake vortex danger areas on the basis of his evaluation of the danger area location on the display.

According to the invention, it is appropriate to save, for example in the data registration system (in the so called 'black box'), the information on the selected delay time, the CP coordinates, the area of the aircraft forecasted positions and the generator wake vortex danger areas within the period of emergency indication of nulling of the distance from the aircraft forecasted positions to the generator wake vortex danger areas. This could enable aircraft accident investigations and estimation of the pilot activities when flying near wake vortices.

The method and system for warning about possible encounter of aircraft with danger areas of the generator wake vortices, according to the invention, can be realized using standard onboard and ground equipment, for example the Airborne Internal Navigation System (AINS), Air Data Computer System (ADC), Doppler System (DS), Forward View Radar (FVR), and using information from the Air Traffic Control (ATC), United Indication System (UIS), Information Exchange Multiplex Channel (IEMC), as well as from information systems used at aircraft of other countries compatible with the above listed systems, for example the Collision Avoidance System (TCAS), Traffic Alert, USA, etc.

Moreover, the warning system devices, according to the invention, can be located separately on different objects of an air traffic control system or on different A/C and VG providing a user with information on results of operational calculations by means of their indication and visualization at the user site.

Users of such information could be aircraft crews, as well as air traffic control service of aerodromes and ships that consult aircraft crews during flights about recommended flight trajectories or about the necessity of the aircraft maneuver to avoid danger flight situations.

It is clear for ATC specialists that the warning system can be implemented also for execution of the flight control functions, as the tracking of vortex situation in the vicinity of ground and flying vortex generators may be implemented by means of warning systems located as stand-alone equipment at aircraft, ships, or aerodromes and combined in the unified information system making possible preventing A/C encounter with wake vortex danger areas generated by different VG. The class of possible VG includes A/C of different types, for example airplanes, helicopters, and unmanned aerial vehicles, sea ships including aircraft carriers, ground structures, and other objects.

Aviation science community and specialists in avionics should clearly see that the method and system for warning about possible encounter of aircraft with danger areas of generator wake vortices according to the invention may include improvements and perfections within the scope of the invention claims and subject associated, for example with different conditions of the system operation, as well as with improvement of navigation and information systems. For example, one can use different calculation algorithms most closely corresponding to operations of the preventing method, apply different approaches to indication and visualization of the user information that could improve adequacy of the user perception, incorporate the use of different information flows in the method operations, etc.

INDUSTRIAL APPLICABILITY

It is appropriate to realize the system for warning about possible encounter of A/C with danger areas of VG wake vortices in the form of computer codes adapted to the A/C type, operational conditions, and the type of the A/C equipment. The codes should be compatible with the air traffic control information systems.

The warning system, according to the invention, can be easily realized by means of the well known computing devices, may be mounted at different aircraft, as well as in different simulators for training of pilots and flight control officers in wake vortex environment.

What we claim:

1. The method for preventing an aircraft from penetrating into a dangerous trailing vortex area of a vortex generator where:

information on the aircraft configuration, position, and orientation with respect to the inertial frame is received at the current time;

information on the vortex generator position, geometrical and weight characteristics, as well as on the generator motion parameters with respect to the inertial frame is received at the current time;

information on the vortex generator position and motion parameters in the inertial frame is saved;

information on ambient parameters in the region of the aircraft and vortex generator collocation is received at the current time;

the generator vortex trajectory in the form of the set of the generator vorticity region center trajectories in the inertial frame, as well as the generator vortex intensity are determined at the current time;

information on the generator vortex trajectory points in the form of the set of the generator vorticity region center trajectories in the inertial frame, as well as on the generator vortex intensity is saved;

the delay time within which the aircraft has a possibility of a flight evasive maneuver providing evasion of the aircraft from the generator vortex danger area after the signal warning against the possibility of wake encounter has been received is selected;

the delay distance, which equals to the distance covered by the aircraft during the delay time is calculated, the control plane located in front of the aircraft perpendicular to its flight direction at the delay distance is modeled, and the forecasted time necessary for the aircraft to gain the control plane in the inertial frame is determined;

the geometrical characteristics of the generator wake vortex danger areas in the form of the set of the danger areas of the generator vorticity regions are determined at the forecasted time;

the generator wake vortex path in the form of the set of the generator vorticity region centers with respect to the inertial frame and the intensity of the wake vortices are determined at the forecasted time;

the coordinates of the intersection point of the generator wake vortex trajectory and the above control plane are determined at the forecasted time of the aircraft flight through it;

the wake vortex danger area in the form of the set of the generator vorticity danger areas, where the entering aircraft can have the flight parameters exceeding the admissible limits is formed around the above intersection point; the area of the aircraft forecasted positions at the forecasted time of the aircraft intersection with the above control plane is formed with due regard to the flight regulations is formed in the above control plane; the alert area is formed around the region of the aircraft forecasted positions; the information on the entrance of the wake danger areas into the alert area is provided to the user;

the coordinates of the points of the area of the aircraft forecasted positions, of the alert area and of the wake vortex danger areas in the aircraft frame are determined;

the distance from the alert area to the danger area of wake vortices in the control plane is calculated;

the distance from the area of the aircraft forecasted positions to the danger area of wake vortices is calculated;

indication for the user of the nulling of the distance from the warning area to the danger area of the generator wake vortices is performed;

emergency indication for the user of the nulling of the distance from the area of the aircraft forecasted positions to the danger area of the generator wake vortices is performed.

2. The method as claimed in claim 1 wherein:

the information on the generator type, flight velocity, angular rate, and coordinates of the generator path points is preferably used as the information on the generator position, geometry, weight, and motion parameters;

the information on the generator path point coordinates, flight velocity, and angular rates of the vortex generator in the inertial frame is saved;

the information on the local wind velocity and direction, altitude wind profile, turbulence intensity, and the underlying terrain type is preferably used as the information on the ambient parameters;

the trajectory and intensity of the generator wake vortices in the form of the set of the generator vorticity area centers at the current time is calculated on the basis of the saved information on the type of the vortex generator, its path point coordinates, flight velocity and angular rates;

the control plane is simulated on the basis of information on the aircraft location, attitude, flight velocity and the chosen delay time at the current time moment in the inertial frame;

the danger area geometry of the generator wake vortices in the form of the set of the generator vorticity danger areas is evaluated on the basis of the saved information on the path point coordinates of the generator wake vortices as the set of the trajectories of the generator vorticity area centers in the inertial frame and the wake intensity, as well as on the basis of information on the aircraft configuration, position, flight velocity, and angular rates in the inertial frame;

the trajectory and intensity of the generator wake vortices at the predicted time are evaluated on the basis of information on the trajectory and intensity of the generator wake vortices in the form of the set of the trajectories of the generator vorticity area centers in the inertial frame;

the coordinates of the intersecting points of the generator wake vortex trajectory with the control plane at the predicted time are evaluated on the basis of information on the control plane coordinates in the inertial frame and on the generator wake vortex trajectory in the inertial frame at the predicted time;

the generator wake vortex danger area in the control plane, the aircraft forecasted position and alert areas are formed on the basis of information on the coordinates of the intersection points of the generator wake vortex trajectory with the control plane at the predicted time, information on the danger area geometry of the generator wake vortices in the form of the set of the generator vorticity danger areas, information on the location, attitude, flight velocity and angular rates of the aircraft with due regard for the flight regulations currently in force;

the coordinates of the area of the aircraft forecasted positions, coordinates of the alert area and coordinates of the wake vortex danger area in the aircraft frame are calculated on the basis of information on the coordinates of the alert area, of the area of the aircraft forecasted positions with due regard for the flight regulations currently in force and of the wake vortex danger area at the predicted time, as well as on the basis of information on the aircraft coordinates and its attitude, preferably, on the aircraft angles of pitch, yaw, and roll in the inertial frame at the current time.

3. The method as claimed in claim 1 wherein the delay time and/or the coordinates of the area of the aircraft forecasted positions the coordinates of the alert area are currently corrected.

4. The method as claimed in claim 1 wherein the method operations are carried out simultaneously with respect to each of the wake vortex generators located in the vicinity of the aircraft and the user is provided with information on the coordinates of the control plane, alert area, area of the aircraft forecasted positions and the generator wake vortex danger areas located in the vicinity of the aircraft.

5. The method as claimed in claim 1 wherein the user is provided with visualization of information on the position of the area of the aircraft forecasted positions, alert area and danger areas of the generator wake vortices in the control plane.

6. The method as claimed in claim 1 wherein the indication of nulling of the distance from the alert area to the danger zone of the generator wake vortices in the control plane and/or the emergency indication of nulling of the distance from the area of the aircraft forecasted positions to the danger area of the generator wake vortices is performed by means of indication chosen from the group including visual, audio and tactile indication.

7. The method as claimed in claim 1 wherein the information on the selected delay time, on the coordinates of the control plane, of the area of the aircraft forecasted positions and of the danger areas of the generator wake vortices is stored during the emergency indication of nulling of the distance from the area of the aircraft forecasted positions to the danger area of the generator wake vortices.

8. The system for preventing an aircraft from penetrating into a dangerous trailing vortex area of a vortex generator comprising:

a aircraft parameters tracker (1) capable of receiving information on the aircraft configuration, location and attitude with respect to the inertial frame at the current time;

a vortex generator tracker (2) capable of receiving information on the position, geometry and weight characteristics, as well on the motion parameters of the wake vortex generator with respect to the inertial frame at the current time;

a memory device (3) capable of saving information on the vortex generator position and motion parameters in the inertial frame;

a ambient parameters detector (4) capable of receiving information on the ambient parameters in the area of the aircraft and generator collocation at the current time;

a wake vortex tracker (5) capable of determining the generator wake path in the form of the set of the generator vorticity area centers in the inertial frame and the wake vortex intensity;

a memory device (6) capable of saving information on the generator wake path coordinates in the form of the set of the generator vorticity area centers in the inertial frame and on the wake vortex intensity;

a device (7) for selection of the delay time capable of calculating the time period within which the aircraft has at least a possibility of a flight evasive maneuver providing evasion of the aircraft from the generator wake danger area after the signal warning against the possibility of wake encounter has been received;

a device (8) for simulation of the control plane capable of calculating the delay distance, which equals to the distance covered by the aircraft during the delay time, modeling the control plane situated in front of the aircraft perpendicular to its flight direction at the delay distance, and determining the forecasted time necessary for the aircraft to gain the control plane in the inertial frame;

a device (10) for determination of the danger area parameters capable of determining the geometrical characteristics of the generator wake vortex danger areas in the form of the set of the danger areas of the generator vorticity regions at the forecasted time;

a forecasting device (9) capable of determining the generator wake path in the form of the set of the generator vorticity region centers with respect to the inertial frame and of the intensity of the generator wake vortices at the forecasted time;

a device (11) for calculation of the intersection points capable of determining the coordinates of the intersection points of the generator wake vortex trajectory and the control plane at the forecasted time of the aircraft flight through it;

an areas and regions forming device (12) capable of forming around the intersection point of the wake vortex path and the control plane of the wake vortex danger area in the form of the set of the generator vorticity danger areas, where the entering aircraft may have the flight parameters exceeding the admissible limits; forming in the control plane of the area of the aircraft forecasted positions at the forecasted time of the aircraft intersection with the control plane with due regard for the flight regulations; forming around the region of the aircraft forecasted positions of the alert area; the information on the entrance of the wake danger areas into the alert area should be provided to the user;

a transformation unit (13) capable of calculating the coordinates of the area of the aircraft forecasted positions, of the alert area and of the wake vortex danger area in the aircraft frame;

a first intersection conditional test unit (14) capable of calculating the distance from the alert area to the wake vortex danger area and marking its nulling;

a second intersection conditional test unit (15) capable of calculating the distance from the area of the aircraft forecasted positions to the wake vortex danger area and marking its nulling;

an indication unit (16) capable of indicating the nulling of the distance from the alert area to the generator wake vortex danger area;

an emergency indication unit (17) capable of indicating the nulling of the distance from the area of the aircraft forecasted positions to the danger area of the generator wake vortices.

9. The system as claimed in claim 8 wherein:

said aircraft parameters tracker (1) is capable of receiving information at least on the aircraft configuration, coordinates, flight velocity, and angles of pitch, yaw and roll;

said vortex generator tracker (2) is capable of receiving information at least on the generator type, flight velocity, angular rates, and coordinates of the trajectory points;

said ambient parameters detector (4) is capable of receiving information at least on the magnitude and direction of the local wind velocity, altitude wind profile, turbulence level, and type of underlying terrain;

said wake vortex tracker (5) is capable of determining the generator wake path in the form of the set of the generator vorticity area centers and the wake vortex intensity on the basis of the saved information on the generator type, trajectory points coordinates, flight velocity, and angular rates;

said device (8) for simulation of the control plane is capable of modeling the control plane on the basis of information on the aircraft position, attitude, and flight velocity, as well as on the delay time;

said device (10) for determination of the danger area parameters is capable of determining the geometrical characteristics of the generator wake vortex danger areas on the basis of the saved information on the vortex generator trajectory points coordinates and the wake vortex intensity, as well as on the aircraft position, flight velocity, and angular rates in the inertial frame;

said forecasting device (9) is capable of determining the vortex generator wake path and the wake vortex intensity on the basis of information on the wake vortex path in the form of the set of the generator vorticity region centers and on the generator wake vortex intensity in the inertial frame;

said device (11) for calculation of the intersection points is capable of determining the coordinates of the intersection points of the generator wake vortex trajectory and the control plane on the basis of information on the control plane coordinates and the wake vortex path in the inertial frame at the forecasted time;

said areas and regions forming device (12) is capable of forming the wake vortex danger area, the area of the aircraft forecasted positions, and the alert area on the basis of information on the coordinates of the intersection points of the generator wake vortex trajectory and the control plane at the forecasted time, information on the danger area geometrical characteristics in the form of the set of the generator vorticity danger areas, information on the aircraft position, attitude, flight velocity, and angular rates in the inertial frame with due regard for flight rules and standards;

said transformation unit (13) is capable of calculating the coordinates of the area of the aircraft forecasted positions, of the alert area and of the wake vortex danger area in the aircraft frame on the basis of information on the coordinates of the alert area, the area of the aircraft forecasted positions and the wake vortex danger area at the forecasted time in the inertial frame and on the basis of information on the aircraft coordinates and attitude, preferably on the aircraft angles of, pitch, yaw and roll, in the inertial frame at the current time.

10. The system as claimed in claim 8 wherein said system comprises the vortex generator tracker (2), memory devices (3, 6), wake vortex tracker (5), device (10) for determination of the danger area parameters, forecasting device (9), device (11) for calculation of the intersection points, areas and regions forming device (12), first and second intersection conditional test units (14, 15), indication device and emergency indication device capable of providing simultaneous performance of their functions with respect to each of vortex generators located in the vicinity of the aircraft.

11. The system as claimed in claim 8 wherein said device (7) for selection of the delay time is capable of adjusting currently the delay time, said areas and regions forming device (12) is capable of adjusting currently the coordinates of the area of the aircraft forecasted positions and the coordinates of the warning area.

12. The system as claimed in claim 8 wherein it contains a device (18) of visualization for the user of information on location of the area of the aircraft forecasted positions and the vortex generator danger areas in the control plane.

13. The system as claimed in claim 8 wherein said device (10) for determination of the vortex generator danger area parameters includes a device comprising:

an aircraft schematization unit (19) capable of calculating the set of geometrical data for the aircraft necessary for evaluation of the additional aerodynamic forces and moments affecting the aircraft, which are induced by the vortex generator wake vortices;

a unit (20) for evaluation of additional aerodynamic forces and moments affecting the aircraft at the given space point, which are induced by the vortex generator wake vortices, capable of calculating them on the basis of the saved information on the coordinates of the vorticity center path points in the form of the set of the vorticity region center paths in the inertial frame and the intensity of the vortex generator wake vortices; of information on the aircraft position, flight velocity, and angular rates in the inertial frame, as well as on the aircraft geometrical characteristics;

a unit (21) for evaluation of the hazard level of aerodynamic perturbations at the given space point capable of estimating the perturbation hazard level according to the hazard criterion chosen by the user;

a unit (22) for determination of a set of space points where the additional aerodynamic forces and moments induced by the vortex generator wake vortices are hazardous; capable of determining the coordinates of points belonging to the danger area on the basis of their selection under the hazard criterion chosen by the user;

a unit (23) for determination of the geometrical characteristics of the wake vortex danger area capable of calculating them on the basis of information on the coordinates of points belonging to the danger area.

14. The system as claimed in claim 8 wherein the admissible aircraft angle of roll is chosen as the hazard critenon.

15. The system as claimed in claim 8 wherein the admissible roll moment induced by the wake vortices is chosen as the hazard criterion.

16. The system as claimed in claim 8 wherein said unit (23) for determination of the geometrical characteristics of the wake vortex danger area is capable of approximating the danger area boundary.

17. The system as claimed in claim 8 wherein said wake vortex tracker (5) and forecasting device (9) contain a programmable component and said device (10) for determination of danger area parameters is realized in the programmable component software and comprise the database of characteristics of wake vortex danger areas for different types of vortex generators.

18. The system as claimed in claim 8 wherein it comprises a device for saving and/or transmitting information to the user on the delay time, coordinates of the control plane, the area of the aircraft forecasted positions and wake vortex danger areas of vortex generators located in the vicinity of the aircraft at least during the time of emergency indication of the nulling event for the distance from the area of the aircraft forecasted positions to the generator wake vortex danger area.

* * * * *